United States Patent
Puranik et al.

(10) Patent No.: US 6,922,566 B2
(45) Date of Patent: Jul. 26, 2005

(54) OPT-IN PINGING AND TRACKING FOR GPS MOBILE TELEPHONES

(75) Inventors: Shirish Puranik, Fremont, CA (US); Anil Tiwari, Palo Alto, CA (US); Michael Walker, Palo Alto, CA (US)

(73) Assignee: At Road, Inc., Fremont, CA (US)

( * ) Notice: Subject to any disclaimer, the term of this patent is extended or adjusted under 35 U.S.C. 154(b) by 103 days.

(21) Appl. No.: 10/378,045

(22) Filed: Feb. 28, 2003

(65) Prior Publication Data

US 2004/0171380 A1 Sep. 2, 2004

(51) Int. Cl.[7] .................................................. H04Q 7/20
(52) U.S. Cl. .................. 455/456.2; 455/456.3
(58) Field of Search ...................... 455/456.1, 456.2, 455/456.3, 456.5, 456.6, 458, 459, 461, 410, 411, 420, 12.1, 13.2, 427, 404.1, 404.2; 342/357; 340/989, 988, 990, 991; 701/24, 33, 207–213

(56) References Cited

U.S. PATENT DOCUMENTS

| | | | |
|---|---|---|---|
| 6,088,457 A | 7/2000 | Parkinson et al. | |
| 6,100,916 A | 8/2000 | August et al. | |
| 6,122,503 A | 9/2000 | Daly | |
| 6,141,544 A | 10/2000 | Corriveau et al. | |
| 6,188,899 B1 | 2/2001 | Chatterjee et al. | |
| 6,195,546 B1 | 2/2001 | Leung et al. | |
| 6,195,547 B1 | 2/2001 | Corriveau et al. | |
| 6,215,994 B1 | 4/2001 | Schmidt et al. | |
| 6,377,810 B1 * | 4/2002 | Geiger et al. | 455/456.2 |
| 6,614,363 B1 * | 9/2003 | Behr et al. | 340/995.19 |
| 6,643,516 B1 * | 11/2003 | Stewart | 340/539.13 |
| 6,714,524 B1 * | 3/2004 | Kim et al. | 370/335 |
| 6,744,384 B2 * | 6/2004 | Flick | 340/989 |

* cited by examiner

*Primary Examiner*—Jean Gelin
(74) *Attorney, Agent, or Firm*—Swernofsky Law Group PC

(57) ABSTRACT

A method and system allowing a mobile phone user to "opt in" to requests with multiple response options, to respond indicating that user wishes not to be tracked, or to respond indicating some information about state, possibly in addition to PVT information. The user has options besides allowing ping responses or turning off GPS tracking. When a ping is received, user chooses whether or not to opt in to the ping. The user may refuse to respond, to respond normally with or without PVT or other information, or to respond saying only that the mobile phone is turned on. GPS tracking continues to operate, so that upon return to normal responses, no cold start of GPS tracking is involved. More intelligent, such as for example rules-based, responses can be made to ping messages, in which GPS tracking interacts with a user interface to determine how to respond flexibly to pings.

34 Claims, 2 Drawing Sheets

OPT-IN PINGING AND TRACKING FOR GPS MOBILE TELEPHONES

BACKGROUND OF THE INVENTION

1. Field of the Invention

The invention relates to locating wireless mobile devices.

2. Related Art

Using wireless communication, mobile devices can communicate with an application server while continuing to move about. This allows the application server to track locations of those mobile devices, such as for a customer application. Customers might wish to know the location of those mobile devices for a number of possible reasons, such as for example to track actions of the carriers of those mobile devices, and to determine the closest mobile device to a selected location. The frequency with which the application might need to know the location of the mobile device can vary substantially with the desires of the customer and with the selected mobile device.

A first set of known systems include devices (herein sometimes called "set-top boxes") that are coupled to a mobile device, such as a vehicle, and automatically report the location of the vehicle to a server, in response to requests by the server from time to time. These requests are sometimes called "ping" messages. The set-top boxes respond to the ping message by generating a PVT (position, velocity, and time) message, and sending that message back to the server using a cellular modem. While these systems generally achieve the goal of determining where the vehicle is from time to time, they are subject to several drawbacks. First, there is no way of knowing, regardless of the response to the ping message, whether or not the vehicle and its personnel (such as the driver and any ancillary personnel assigned to that vehicle) are anywhere near the vehicle, or what they are doing, or whether they intend to return to the vehicle at any particular time. Second, it may sometimes occur that the vehicle personnel might not wish to respond to the ping message (such as for example if they are on a lunch break), but they do not have any way to cause the set-top box to refuse to respond to the ping message.

A second set of known systems include GPS-enabled mobile phones, which include both a mobile phone and its associated software, as well as a GPS antenna and associated software for GPS tracking. In one known system, GPS-enabled mobile phones have been equipped to respond to a ping message. While this system generally achieves the goal of determining where the mobile phone user is from time to time, it is subject to several drawbacks. If the mobile phone user does not wish to be tracked, that user is capable of turning the mobile phone off, which would prevent both reception and response to a ping message. Alternatively, if the mobile phone user does not wish to be tracked, the mobile phone user is capable of turning off the GPS tracking application, which would prevent a response to a ping message. Third, if the user does either of these in an effort to prevent being tracked, it can take substantial time (as much as up to 10–15 minutes) for the GPS tracking application to re-determine the location of the GPS-enabled mobile phone. This latter effect is herein sometimes referred to as a "cold start" of the GPS tracking application.

Accordingly, it would be advantageous to provide techniques capable of allowing users more flexibility to determine whether they are tracked, without drawbacks of the known art.

SUMMARY OF THE INVENTION

The invention provides a method and system capable of allowing the user of a mobile phone to "opt in" (or "opt out") of responding to a ping message, to respond to a ping message with a response indicating that the user does not wish to be tracked, or more generally, to respond to a ping message with an intelligent response indicating some information about the user's state, whether or not in addition to the PVT information that would ordinarily be associated with a GPS response to the ping message.

In one aspect, the invention provides an enhancement to the GPS tracking application, in which the user is given an additional option besides just (1) allowing ping responses, and (2) turning off the GPS tracking application. In this additional option, when a ping message is received, a message is presented to the user, such as on the mobile phone display, or perhaps by other techniques, in which the user is given a choice of whether or not to opt in to the ping message. In one embodiment, the user may choose at least (3A) to refuse to respond, (3B) to respond normally, or (3C) to respond with a message saying that the mobile phone is turned on, but that no PVT information will be provided.

In one aspect, the invention causes the GPS tracking application to continue to operate, so that when the user returns to normal responses to ping messages, no cold start of the GPS tracking application is involved.

In one aspect, the invention provides for more intelligent, such as for example rules-based, responses to ping messages, in which the GPS tracking application interacts with a user interface to determine how to respond flexibly and robustly to ping messages. For several examples, not intended to be limiting in any way, the user might instruct the GPS tracking application and user interface as follows:

The user might direct the mobile phone to respond to ping messages with a selected message, either with or without PVT information. For example, the selected message might indicate what job the user is at, or that the user is on break or off shift, or that the user is handling an exceptional situation (such as an equipment failure or emergency service).

The user might direct the mobile phone to respond to ping messages selectively in response to information from the GPS tracking application. For example, the user might indicate not to respond to ping messages for a selected period of time, or for so long as the user is within a selected distance of a known landmark, or until the user attains a selected velocity (as when traveling on a public road).

The user might direct the mobile phone to inform the server with additional information, with the effect that the server sends ping messages less or more often, in response to selected inputs directly from the user or from the GPS tracking application. For example, the user might request the server not to send any ping messages for a selected period of time, or might request the server to send ping messages much less frequently for a selected period of time (such as when the user is off shift). For another example, the server might include a rule by which it alters its behavior regarding ping messages in response to the response provided by the mobile phone, such as sending ping messages less often if the mobile phone responds without any PVT information.

INCORPORATED DISCLOSURES

Figure 1:
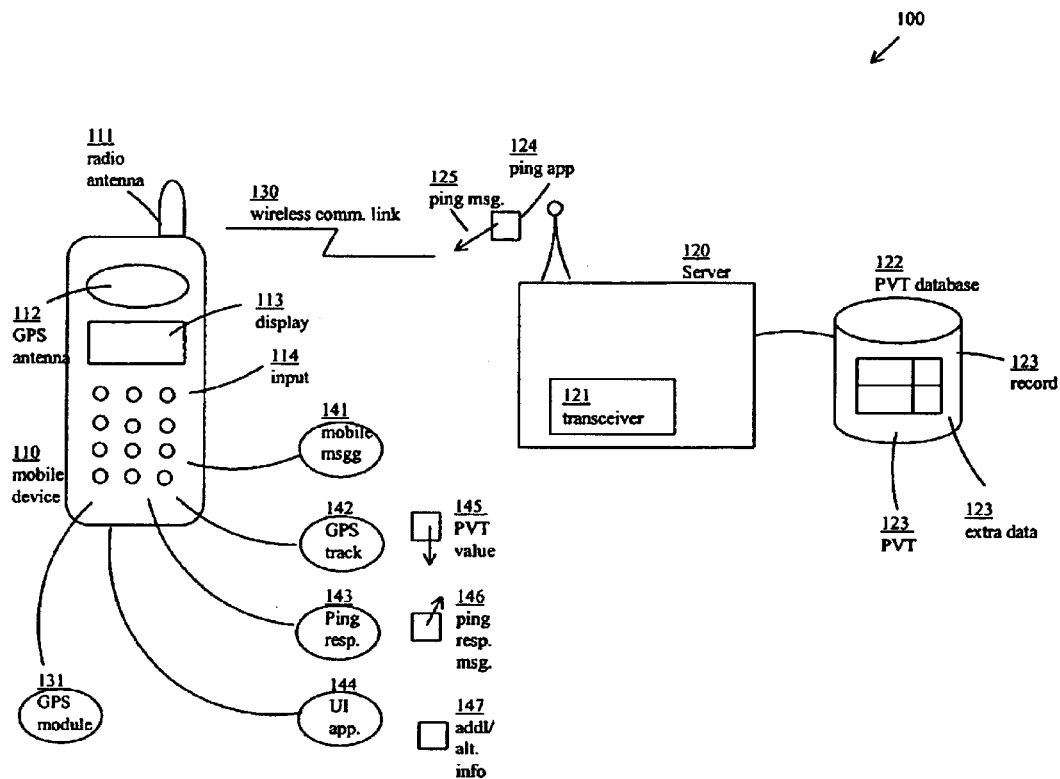
FIG. 1 shows a block diagram of a system including opt-in pinging and tracking for mobile devices.

Inventions described herein can be used in conjunction with technology described in the following documents:

U.S. patent application Ser. No. 09/698,888 (Express Mail Mailing No. EL 487 707 095 US), filed Oct. 27, 2000, in the name of Kulbir SANDHU and Rodric FAN, attorney docket number M-8824 US, client reference number 13, titled "System and Method for Just-in-time Vehicle Maintenance", and applications claiming priority therefrom.

These documents are hereby incorporated by reference as if fully set forth herein, and are sometimes referred to herein as the "incorporated disclosure".

DETAILED DESCRIPTION OF THE PREFERRED EMBODIMENT

In the description herein, one embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The general meaning of each of these following terms is intended to be illustrative and in no way limiting.

The phrase "mobile device" describes any device logically and possibly physically remote from the server. Although there might be many such mobile devices, they are generally referred to one at a time below, except where that might be confusing. As described below, in one embodiment, the mobile device is associated with a user and is often also associated with a vehicle also associated with that user, although the latter is not required. Also as described below, the mobile device might be located within a wide range of possible locations.

The term "ping" and the phrase "ping message" describe communication between two devices (such as a client and server), in which a sending device requests a response indicating status about the receiving device. The status might be as simple as whether or not the receiving device is able to respond, or might include substantially more information, such as for example a set of GPS PVT (position, velocity, time) values. In the context of the invention, the concept of a ping is intended to be broad, and includes any other type of status-requesting message.

The phrase "opt in" describes any decision, whether made by active choice, by default, or by rules selected or activated ahead of time, by which a user or other entity alters the prospective response of the mobile phone to a ping message. In the context of the invention, the concept of opting in is intended to be broad, and includes any type of conditional decision or similar behavior.

The term "PVT," the phrase "PVT data," and the phrase "PVT information" describe information regarding location of the mobile phone. In one embodiment, PVT data specifically refers to a tuple including a (position, velocity, time) data point, and is suitable for entry in a database of such PVT data points. However, in the context of the invention, there is no particular requirement for PVT data to be so specific. Additional information might be stored in the same or another database in association with the PVT data points, but is not generally referred to herein as PVT data.

The phrases "ping response" and "ping response message" describe messages sent by a mobile phone or similar device in response to a ping message. In one embodiment, the ping response includes PVT data.

The phrase "GPS tracking application" describes a set of instructions interpretable by a computing device at a mobile phone, or similar device, and capable of causing that computing device to determine PVT data in response to GPS satellite measurements.

The term "tracking" describes any technique involving information about the location or relative location of a user or device. For example, not intended to be limiting in any way, the phrase "GPS tracking" describes techniques involving using GPS to determine a PVT (position, velocity, and time) data point. In the context of the invention, the concept of tracking is intended to be broad, and includes techniques other than GPS, such as for example triangulation using cellular or other wireless technology, transponder responses, and the like.

The phrases "cold start" and "warm start" describe alternative techniques involved in use of the GPS tracking application. In a cold start, the GPS tracking application re-acquires contact with GPS satellites or re-obtains GPS satellite information as if it had no prior knowledge of its position, velocity, or the time. As described herein, a cold start might take substantial time, such as for example up to 10–15 minutes to actually re-acquire contact with GPS satellites and re-calculate PVT (position, velocity, and time) information therefrom. In a warm start, the GPS tracking application has already been updating its PVT information from time to time, and merely involves obtaining a most recent set of GPS satellite information to update its PVT information. As described herein, a warm start might take as little as a few seconds, or if it is deemed satisfactory, a warm start might take no time at all as the GPS tracking application might simply report its last known PVT information. In the context of the invention, the concept of the distinction between cold start and warm start is intended to be broad, and includes any other distinction between techniques of operation of the GPS tracking application in response to user operation.

The phrase "user state" describes any information about the user, the mobile phone or any person or entity associated therewith. For example, not intended to be limiting in any way, user state might include the possibility that the user is on break or off shift, is at a particular job (whether scheduled or unscheduled), is conducting an emergency or otherwise extraordinary task (such as for example an unscheduled repair or helping a motorist out of trouble), is at lunch or on vacation, is on overtime, needs assistance, and the like. In the context of the invention, the concept of user state is intended to be broad, and includes any information of potential relevance to the system, the business using the system, or the individuals involved (such as for example personal messages to or from family members).

The term "presented" and the phrase "presented to the user" describe any technique involving sending information to a user of the mobile phone. In one embodiment, information is presented to the user using a visual display, such as for example used with an SMS message, or other mobile message, display. However, in alternative embodiments, information may be presented to the user involving other techniques, such as a selected ring tone, a selected lamp or light directed to the purpose of presenting that information, an audio message, such as a computer-generated or a recorded message to the user, any related technique, or some combination or conjunction of these items. In the context of the invention, the concept of presenting information to the user is intended to be broad, and includes any other type of technique by which information is sent to and received by the user.

The phrase "server device" describes any device logically and possibly physically remote from the mobile device(s) and also possibly logically or possibly physically remote from a server administrator. As described below, in one embodiment, the server device is associated with a server administrator. There is no particular requirement that the server device is a single hardware "device." In some embodiments, the server device might include multiple devices operating cooperatively (such as when networked) or might include a portion of one or more devices.

The phrase (server) "administrator" describes any individual or other entity responsible for administering, operating, programming, or performing other alterations to the server. There is no particular requirement that the server administrator is a single person; in some embodiments the server administrator might include multiple persons with the authority to act individually or collectively.

The scope and spirit of the invention is not limited to any of these definitions, or to specific examples mentioned therein, but is intended to include the most general concepts embodied by these and other terms.

System Elements

FIG. 1 shows a block diagram of a system including opt-in pinging and tracking for GPS mobile devices.

A system 100 includes a mobile device 110, a server 120, and a (wireless) communication link 130.

In one embodiment, the mobile device 110 includes a mobile phone, such as for example a cellular telephone or other radiotelephone. The mobile device 110 is disposed in a housing, such as for example a handset for a mobile phone, and includes a radio antenna 111, a GPS antenna 112, a display element 113, an input element 114, a processor and program or data memory (not shown), and a set of application software maintained in that program or data memory and performed from time to time by that processor.

Although in one embodiment, the mobile device 110 includes a mobile phone, the concept of the invention is general enough to include systems 100 in which the mobile device 110 involves a different type of hand-carried device, such as a pager, a "Palm Pilot" or PDA (personal digital assistant) or other handheld computer, a notebook or laptop computer, a telephone, a watch, a location or condition sensor, a biometric sensing or reporting device, a pacemaker, a telemetry device, or a remote homing device.

Although in one embodiment, the mobile device 110 includes its own radio antenna 111 and GPS antenna 112, the concept of the invention is general enough to include systems 100 in which the mobile device 110 makes use of an attached transceiver, such as for example an auxiliary cellular or satellite telephone, a radio transceiver, a microwave transceiver, and the like, or such as for example an auxiliary GPS antenna or GPS tracking device.

In one embodiment, the server 120 includes a computing device, such as for example an application server or other computing server. The server 120 includes a transceiver 121, a database 122 including a set of records 123 (at least some records 123 of which include PVT information and some records 123 of which might include additional or alternative information), a processor and program or data memory (not shown), and a set of application software maintained in that program or data memory and performed from time to time by that processor. The application software includes at least one ping application 124 capable of generating a ping message 125, with the effect that the ping message 125 can be sent to the mobile device 110.

Although in one embodiment the transceiver 121 includes an antenna, a receiver, and a transmitter, those skilled in art will realize, after perusal of this application, that the concept of the invention is general enough to include systems in which the server 120 can communicate using a detachable transceiver, such as a cellular or satellite telephone, a radio transceiver, a wireless or wireline modem, or any other technique capable of enabling communication between the mobile device 110 and the server using the communication link 130.

The communication link 130 includes a communication network having at least one wireless communication path between the mobile device 110 and the server 120. In one embodiment, the wireless communication path includes a wireless cellular or satellite telephone connection, such as might be available from a voice cellular or satellite telephone provider (in combination with a voice/data modem, to transmit data other than voice) or such as might be available from a data cellular provider or satellite data link.

Those skilled in the art will recognize, after perusal of this application, that the invention has no limitation to any particular technique for wireless communication. Although one embodiment of the invention might use TDMA wireless communication, the invention is equally applicable to CDMA wireless communication, other techniques for wireless communication, or combinations or conjunctions thereof.

Those skilled in the art will recognize, after perusal of this application, that the invention has no particular limitation to only wireless communication. The invention can be used with wireline communication, or with communication using a communication network that includes both wireless and wireline communication paths (and does not force communication to use either one). Although one embodiment of the invention uses wireless communication, due to the mobile nature of the mobile devices to be programmed and their likely lack of connectivity using only wireline communication paths, but there is no particular limitation of the nature of the invention to wireless only.

1. Mobile Device

In one embodiment, the application software includes a messaging application 141 capable of receiving and sending mobile messages (such as for example SMS messages), a GPS tracking application 142 capable of acquiring GPS satellite communication and obtain GPS satellite information, a ping response application 143 capable of receiving ping messages 125 and responding to those ping messages 125, and a UI application 144 capable of interacting with the user to receive messages from the user and to present messages to the user.

At least some of the time, the GPS tracking application 142 has associated with it at least one PVT data value 145 (including a position value, a velocity value, and a time stamp, to the degree of accuracy permitted by GPS satellite tracking techniques). At least some of the time, the ping response application 143 has associated with it at least one ping response message 146 (possibly including a PVT data value 145 and possibly including additional or alternative information 147).

The processor, using the program and data memory, performs instructions associated with the messaging application 141. The messaging application 141 is coupled to the radio antenna 111, to the display element 113, and to the input element 114. The messaging application 141 uses the radio antenna 111 to receive mobile messages, such as for example SMS (short message service) messages, for delivery to the user, and uses the display element 113 to present those messages to the user. The messaging application 141 uses the input element 114 to receive messages for sending by the user, and uses the radio antenna 111 to deliver those messages to the communication link 130 for ultimate delivery to their intended recipients.

The processor, using the program and data memory, performs instructions associated with the GPS tracking application 142. The GPS tracking application 142 is coupled to the GPS antenna 112 and uses the GPS antenna 112 to acquire GPS satellite communication and obtain GPS satellite information. The GPS tracking application 142 generates, from time to time (such as periodically) a sequence of PVT data values 145.

The processor, using the program and data memory, performs instructions associated with the ping response application 143. The ping response application 143 is coupled to the radio antenna 111. The ping response application 143 uses the radio antenna 111 to receive ping messages 125 from the server 140. The ping response application 143 decodes those ping messages 125. If a response is appropriate, the ping response application 143 generates a ping response message 146. As noted above, the ping response message 146 possibly includes a PVT data value 145 and possibly includes additional or alternative information 147. The ping response application 143 uses the radio antenna 111 to transmit the ping response messages 146 (if any) to the server 140.

The processor, using the program and data memory, performs instructions associated with the UI application 144. The UI application 144 is coupled to the display element 113 and to the input element 114. The UI application 144 uses the input element 114 to receive messages from the user, such as for example commands to the GPS module 131 or the ping response application 143, messages for delivery as part of ping response messages 146, parameters for use by the GPS module 131 or the ping response application 143, and the like. The UI application 144 uses the display element 113 to present messages to the user, such as for example information from the ping response application 143 delivered as part of ping messages 125 or generated in response to ping messages 125, parameters in use by the GPS module 131 or the ping response application 143, and the like. In one embodiment, the UI application 144 involves the messaging application 141 in presenting messages to the user.

2. Opt-In Pinging and Tracking

In one embodiment, the GPS tracking application 142 is responsive to a message from the user, delivered using the UI application 144, causing the GPS tracking application 142 to be turned off. In such cases, when the ping response application 143 receives a ping message 125, the GPS tracking application 142 is not available to provide a PVT data value 145, and the ping response message 146 (if any) does not include any PVT information.

In one embodiment, the ping response application 143 can take one of at least three possible different actions in response to a ping message 125:

The ping response application 143 can respond to the ping message 125 with a PVT data value 145. In such cases, the ping response application 143 receives the ping message 125 and parses the ping message 125 to determine what to do. In response to the ping message 125, the ping response application 143 requests a PVT data value 145 from the GPS tracking application 142, generates a ping response message 146 including that PVT data value 145, and sends that ping response message 146 to the server 120. As described above, if the GPS tracking application 142 is not available to provide a PVT data value 145, the ping response message 146 does not include any PVT information.

The ping response application 143 can decline to respond to the ping message 125. In such cases, the ping response application 143 receives the ping message 125 and parses the ping message 125 to determine what to do. In response to the ping message 125, the ping response application 143 takes no further action, does not generate a ping response message 146, and does not send any ping response message 146 to the server 120.

The ping response application 143 can ask the user if it should respond to the ping message 125, and if so, how. In such cases, the ping response application 143 receives the ping message 125 and parses the ping message 125 to determine what to do. In response to the ping message 125, the ping response application 143 requests that the UI application 144 present a message to the user using the display element 113, and requests that the UI application receive a response from the user using the input element 114. In response to the response from the user, the ping response application 143 determines whether to request a PVT data value 145 from the GPS tracking application 142, determines whether to generate a ping response message 146 including that PVT data value 145 (or any additional information 147), and determines whether to send any ping response message 146 to the server 120.

In such cases when the ping response application 143 asks the user if it should respond to the ping message 125, the user is given at least three possible different instructions to give the ping response application 143:

The user can choose to have the ping response application 143 respond to the ping message 125 with a PVT data value 145. For one example, not intended to be limiting in any way, this might occur if the user does not mind being tracked. In such cases, similar to the technique described above, the ping response application 143 requests a PVT data value 145 from the GPS tracking application 142, generates a ping response message 146 including that PVT data value 145, and sends that ping response message 146 to the server 120.

The user can choose to have the ping response application 143 decline to respond to the ping message 125. For one example, not intended to be limiting in any way, this might occur if the user does not wish to be tracked. In such cases, similar to the technique described above, the ping response application 143 takes no further action, does not generate a ping response message 146, and does not send any ping response message 146 to the server 120. In alternative embodiments, the ping response application 143 may generate and send a ping response message 146 to the server 120 saying that the user does not wish to be tracked.

The user can choose to have the ping response application 143 respond to the ping message 125, but with no PVT data value 145. For one example, not intended to be limiting in any way, this might occur if the user does not wish to be tracked, but does not mind responding with an indicator that the user is still active. In such cases, the ping response application 143 generates a ping response message 146, not including any PVT data value 145 but possibly including other additional information 147, and sends that ping response message 146 to the server 120.

Those skilled in the art will recognize, after perusal of this application, that when the ping response application 143 generates and sends a ping response message 146, there is no linkage between whether that ping response message 146 contains a PVT data value 145, other additional information 147, or nothing. This has the effect that a ping response message 146, if sent, might include (a) no information, except of course the derivable fact that the mobile device 110 has responded to the ping message 125, (b) only the PVT data value 145, (c) only the other additional information 147, or (d) both the PVT data value 145 and the other additional information 147.

Those skilled in the art will also recognize, after perusal of this application, that when the ping response application 143 generates and sends a ping response message 146, that ping response message 146 might include information (herein sometimes referred to as additional information 147) of value to the server 120 or to an entity associated with that server 120. This additional information 147 might be selected directly by the user, or might be selected in response to the UI application 144 and some rules-based responses to status information about the user's activity collected by the UI application 144.

For a first example, not intended to be limiting in any way, the user might directly insert within the additional information 147 some status information about the user's activity, such as for example what job the user is at, or that the user is on break or off shift, or that the user is handling an exceptional situation (such as an equipment failure or emergency service). This status information might be included either with or without PVT information. For example, not intended to be limiting in any way, the user might desire to not include PVT information with a status message about being on break or off shift, but might be quite willing to include PVT information with a status message about handling an exceptional situation such as an equipment failure or emergency service.

For a second example, not intended to be limiting in any way, the user might direct the mobile phone to respond to ping messages selectively in response to information from the messaging application 141 or the GPS tracking application 142, such as for example to respond to ping messages 125 in a selected manner until the user receives or sends a selected message (such as a new status report), or until the user receives or sends a message from a selected other user (such as a supervisor or co-worker), or for a selected period of time (such as for a lunch break for a designated time), or for so long as the user is within a selected distance of a known landmark (such as for working at a specific job or for rendering emergency service), or until the user attains a selected velocity (such as when traveling on a public road).

Those skilled in the art will also recognize, after perusal of this application, that the user might direct either the messaging application 141, or the GPS tracking application 142, or both, to be turned off in response to user interaction with the UI application 144. As described herein, when the GPS tracking application 142 is turned off, restarting the GPS tracking application 142 involves a cold start, so that obtaining new PVT information might take significant time. This has the effect that it might be preferable for the user to allow the GPS tracking application 142 to operate continuously, even at times when the user directs the ping response application 143 to not provide PVT data points 125 or to not provide any ping response message 146 at all. If the user takes this action, this has the effect that the GPS tracking application 142 continues to operate, so that when the user directs the ping response application 143 to return to normal responses to ping messages 125, no cold start of the GPS tracking application 142 would be involved.

In one aspect, the invention also provides for more intelligent, such as for example rules-based, responses to ping messages 125, in which the messaging application 141 or the GPS tracking application 142 interacts with the ping response application 143 or the UI application 144, with the effect of determining how to respond flexibly and robustly to ping messages 125.

For a first example, not intended to be limiting in any way, the user might directly request the server 120 to send ping messages 125 at a selected rate (the server 120 might or might not actually comply with this request). For example, not intended to be limiting in any way, the user might directly request the server 120 to not send any ping messages 125 for a selected time, or to not send any ping messages 125 until the user requests that ping messages 125 are restarted, or to send ping messages 125 at a selected rate, or some combination or conjunction thereof.

For a second example, not intended to be limiting in any way, the user might request the server 120 to send ping messages 125 only in response to, or at a rate in response to, selected PVT information (again, the server 120 might or might not actually comply with this request). For example, not intended to be limiting in any way, the user might request the server to alter its behavior regarding ping messages 125 in response to PVT data points 145 or lack thereof, such as sending ping messages 125 less often if the mobile device 110 responds without any PVT information, or such as sending ping messages 125 less often if the mobile device 110 is outside a selected primary service area, or such as sending ping messages 125 more often if the PVT information indicates that the mobile device 110 is traveling at or above a selected velocity.

Those skilled in the art will also recognize, after perusal of this application, that when the ping response application 143 generates and sends a ping response message 146, that ping response message 146 might include information requesting the server 120 (or an entity associated with that server 120) to perform as directed by the user.

3. Server

As described above, in one embodiment, the application software includes a ping application 124 capable of generating a ping message 125, with the effect that the ping message 125 can be sent to the mobile device 110. In one embodiment, the application software also includes a PVT database application 151 capable of maintaining a database of PVT information, an messaging application 153 capable of receiving and sending mobile messages (such as for example SMS messages), and a rules-based application 154 capable of maintaining a set of rules to be followed with regard to sending ping messages 125 to selected mobile phones 110.

The processor at the server 120, using the program and data memory at the server 120, performs instructions associated with the ping application 124. The ping application 124 is coupled to the transceiver 121 and to the PVT database application 151. The ping application 124 sends ping messages 125 to the mobile device 110 and receives any ping response messages 146 from the mobile device 110. If there are such ping response messages 146, the ping application 124 parses those ping response messages 146, determines any included PVT data values 145 and any included additional information 147, and sends those PVT data values 145 to the PVT database application 151.

The processor at the server 120, using the program and data memory at the server 120, performs instructions associated with the PVT database application 151. The PVT database application 151 is coupled to the ping application 124 and to a PVT database 152. The PVT database application 151 obtains any PVT data values 145 and any additional information 147 included in any ping response messages 146 received by the ping application 124. The PVT database application 151 maintains those PVT data values 145 and that additional information 147 in the PVT database 152 for possible later retrieval and use.

The processor at the server 120, using the program and data memory at the server 120, performs instructions associated with the messaging application 153. The messaging application 153 is coupled to the transceiver 121. The messaging application 153 uses the transceiver 121 to send messages for delivery to the mobile device 110 and ultimately to the user.

The processor at the server 120, using the program and data memory at the server 120, performs instructions associated with the rules-based application 154. The rules-based application 154 is coupled to the ping application 124. The rules-based application 154 maintains any rules to be used to direct the ping application 124, and performs those rules to direct the ping application 124 to operate according thereto.

Method of Operation

Figure 2:
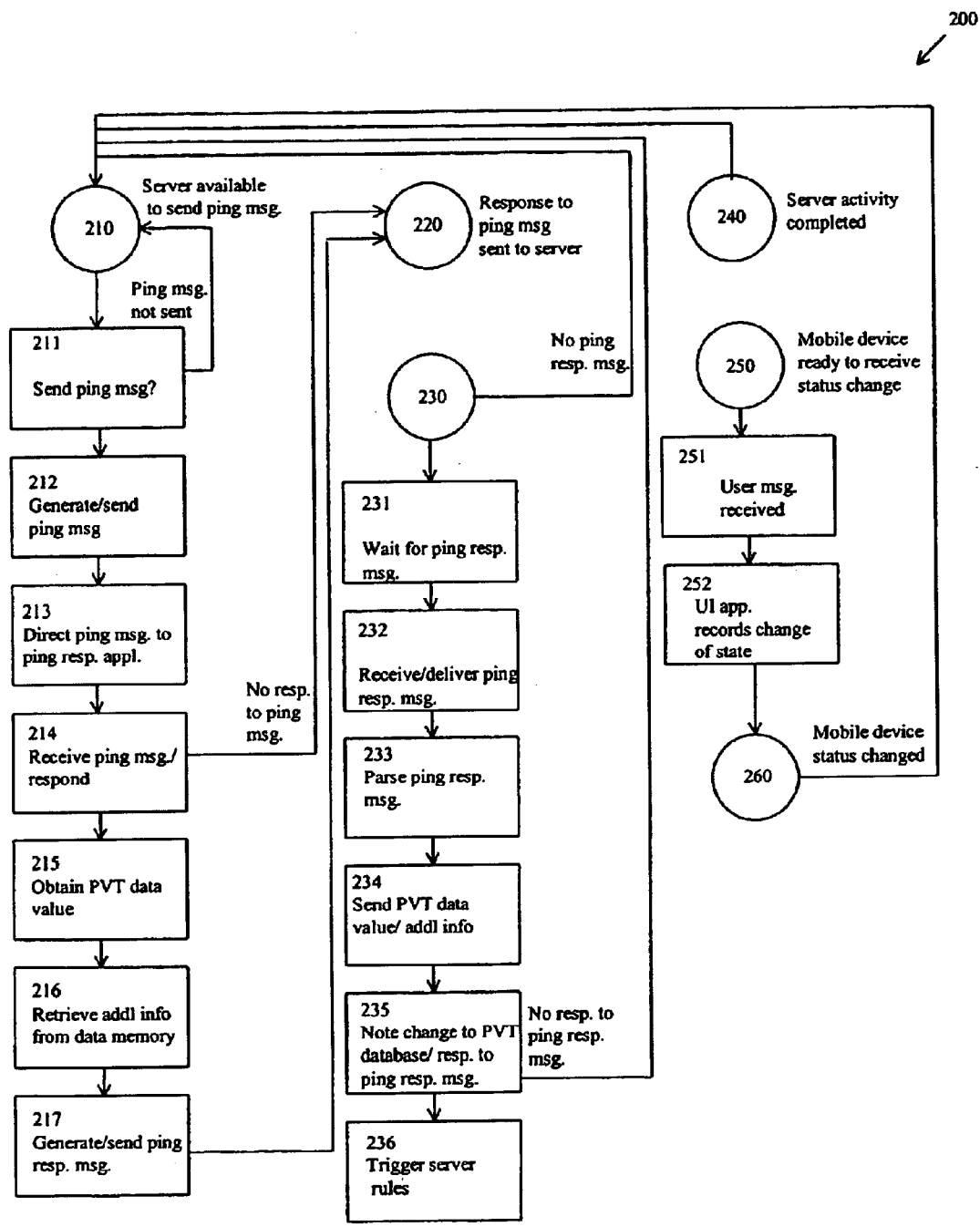
FIG. 2 shows a process flow diagram of a method including opt-in pinging and tracking for mobile devices.

FIG. 2 shows a process flow diagram of a method including opt-in pinging and tracking for GPS mobile devices.

A method 200 is performed by the system 100. Although the method 200 is described serially, the flow points and steps of the method 200 can be performed by separate elements in conjunction or in parallel, whether asynchronously or synchronously, in a pipelined manner, or otherwise. There is no particular requirement that the method 200 must be performed in the same order in which this description lists flow points or steps, except where explicitly so indicated.

1. Mobile Device Response to Ping

At a flow point 210, the server 120 is available to send a ping message 125 to the mobile device 110.

At a step 211, the ping application 124 at the server 120 determines whether to send a ping message 125 (that is, whether it is too soon to send such a ping message 125, or whether enough time has elapsed to do so). If not, the method 200 returns to the flow point 210, where the server 120 might send a ping message 125 to a different mobile device 110, or where the server 120 might wait to send a ping message 125 at a later time.

At a step 212, the ping application 124 at the server 120 generates a ping message 125 directed to the mobile device 110, and sends the ping message 125 using the transceiver 121.

At a step 213, the mobile device 110 receives the ping message 125 using the radio antenna 111 at the mobile device 110, and directs the ping message 125 to the ping response application 143.

At a step 214, the ping response application 143 at the mobile device 110 receives the ping message 125, and determines (in response to the state of the mobile device 110 set by the user using the UI application 144) whether to respond to the ping message 125, and if so, how to respond. If the ping response application 143 declines to respond to the ping message 125, the method 200 continues with the flow point 220.

At a step 215, if the ping response application 143 determined that it would respond to the ping message 125, and further that the response would include a PVT data value 145, the ping response application 143 obtains that PVT data value 145 from the GPS tracking application 142.

At a step 216, if the ping response application 143 determined that it would respond to the ping message 125, and further that the response would include additional information 147, the ping response application 143 retrieves that additional information 147 from data memory at the mobile device 110.

At a step 217, if the ping response application 143 determined that it would respond to the ping message 125, the ping response application 143 generates a ping response message 146, possibly including a PVT data value 145 (as obtained at the step 215) and possibly including additional information 147 (as obtained at the step 216). As part of this step, the ping response application 143 sends the ping response message 146 to the server 120.

At a flow point 220, the ping response application 143 has made whatever response it was going to make, if any, to the ping message 125 (possibly including no response, possibly including only a PVT data value 145, possibly including only additional information 147, and possibly including both a PVT data value 145 and additional information 147), and has sent that response, if any, to the server 120. The method 200 continues with the flow point 230.

2. Server Activity After Ping

At a flow point 230, the server 120 has sent a ping message 125 to the mobile device 110, and is available to receive a ping response message 145 from the mobile device 110.

At a step 231, the server 120 waits for a ping response message 146 from the mobile device 110, using known protocol techniques. For a first example, not intended to be limiting in any way, the server 120 might send the ping message 125 a selected number of times (such as for example three times), each time waiting for a response. If after a selected number of times, there is no ping response message 146, the server 120 decides that the mobile device 110 has opted out of responding to the ping message 125, and the method continues with the flow point 210.

At a step 232, the server 120 receives the ping response message 146 from the mobile device 110. As part of this step, the server 120 delivers the ping response message 146 to the ping application 124 at the server 120.

At a step 233, the ping application 124 at the server 120 parses the ping response message 146 and determines if it includes a PVT data value 145 or any additional information 147.

At a step 234, the ping application 124 at the server 120 sends the PVT data value 145, if any, and the additional information 147, if any, to the PVT database application 151 at the server 120. As part of this step, the PVT database application 151 records the receipt of the ping response message 146, as well as the PVT data value 145, if any, and the additional information 147, if any, in the PVT database 152.

At a step 235, the rules-based application 154 notes the change to the PVT database 152, including the receipt of the ping response message 146, as well as the PVT data value 145, if any, and the additional information 147, if any. As part of this step, the rules-based application 154 determines if any rules at the server 120 should be triggered in response to the ping response message 146. If not, the rules-based application 154 takes no further action, and the method 200 continues with the flow point 210.

At a step 236, if any rules at the server 120 should be triggered, the rules-based application 154 triggers those rules. For one example, not intended to be limiting in any way, one rule might be to reduce the rate at which ping messages 125 are sent to the mobile device 110, if the mobile device 110 has responded to a ping message 125 with a ping response message 146 asking for such a reduction.

At a flow point 240, the server 120 has completed its activity after receiving (or failing to receive) a ping response message 145 from the mobile device 110. The method 200 proceeds with the flow point 210.

3. Opting-In or Opting-Out of Pinging and Tracking

At a flow point 250, the mobile device 110 is ready to receive a change in status from the user regarding opting-in or opting-out of pinging and tracking.

At a step 251, the UI application 144 receives a message from the user regarding status of the mobile device 110 opting-in or opting-out of pinging and tracking. The following examples, not intended to be limiting in any way, are possibilities:

The user might direct the mobile device 110 to respond to ping messages 125 with a selected message, either with or without PVT information. For example, the selected message might indicate what job the user is at, or that the user is on break or off shift, or that the user is handling an exceptional situation (such as an equipment failure or emergency service).

The user might direct the mobile device 110 to respond to ping messages 125 selectively in response to information from the GPS tracking application 142. For example, the user might indicate not to respond to ping messages 125 for a selected period of time, or for so long as the user is within a selected distance of a known landmark, or until the user attains a selected velocity (as when traveling on a public road).

The user might direct the mobile device 110 to inform the server 120 with additional information 147, with the effect that the server 120 sends ping messages 125 less or more often, in response to selected inputs directly from the user or from the GPS tracking application 142. For example, the user might request the server 120 not to send any ping messages 125 for a selected period of time, or might request the server 120 to send ping messages 125 much less frequently for a selected period of time (such as when the user is off shift). For another example, the server 120 might include a rule by which it alters its behavior regarding ping messages 125 in response to the response provided by the mobile device 110, such as sending ping messages 125 less often if the mobile phone 110 responds without any PVT information 145.

At a step 252, the UI application 144 records the change of state in the program or data memory for the mobile device 110.

At a flow point 260, the mobile device 110 has changed its status regarding opting-in or opting-out of pinging and tracking. The method 200 proceeds with the flow point 210.

Alternative Embodiments

Although preferred embodiments are disclosed herein, many variations are possible which remain within the concept, scope, and spirit of the invention. These variations would become clear to those skilled in the art after perusal of this application.

The invention applies to any (automated or semi-automated) activity or any control information to be used with the mobile device 110, not necessarily just to ping messages 125. For one example, not intended to be limiting in any way, the invention might be applicable to other forms of automatic response by the mobile device 110 to messages from the server 120.

Those skilled in the art will recognize, after perusal of this application, that these alternative embodiments are illustrative and in no way limiting.

What is claimed is:

1. A method, including steps of receiving a message, at a mobile device, from a physically remote server requesting information from the mobile device, the information comprising status of the mobile device;

in response to said message, requesting a response from a user of said mobile device; and in response to said response, taking one of a plurality of possible actions in response to said message, said plurality of possible actions including at least: responding to said message in a first way, responding to said message in a second way, declining to respond to said message.

2. A method as in claim 1, wherein said message includes a request for tracking information.

3. A method as in claim 2, wherein said first way does not include said tracking information.

4. A method as in claim 2, wherein said first way includes information other than said tracking information.

5. A method as in claim 2, wherein said first way includes said tracking information.

6. A method, including steps of receiving information from a user regarding how to respond to a message, said message being from a physically remote server and requesting information comprising status of the mobile device from the mobile device;

maintaining a state of said mobile device in response to said information; and being prepared to respond to said message in response to said state;

wherein said state includes a selection of one of a plurality of possible actions in response to said message, said plurality of possible actions including at least: responding to said message in a first way, responding to said message in a second way, declining to respond to said message.

7. A method as in claim 6, wherein said state is responsive to at least one of: a position of said mobile device, a velocity of said mobile device, a time, or a combination or conjunction of two of said values.

8. A method as in claim 6, wherein said message includes a request for tracking information.

9. A method as in claim 8, wherein said first way does not include said tracking information.

10. A method as in claim 8, wherein said first way includes information other than said tracking information.

11. A method as in claim 8, wherein said first way includes said tracking information.

12. Apparatus including instructions capable of being performed by a computing device to
  receive a message, at a mobile device, from a physically remote server requesting information from the mobile device, the information comprising status of the mobile device;
  in response to said message, request a response from a user of said mobile device; and
  in response to said response, take one of a plurality of possible actions in response to said message, said plurality of possible actions including at least: responding to said message in a first way, responding to said message in a second way, declining to respond to said message.

13. Apparatus as in claim 12, wherein said message includes a request for tracking information.

14. Apparatus as in claim 13, wherein said first way does not include said tracking information.

15. Apparatus as in claim 13, wherein said first way includes said tracking information.

16. Apparatus as in claim 13, wherein said first way includes information other than said tracking information.

17. Apparatus including instructions capable of being performed by a computing device to
  receive information from a user regarding how to respond to a message, said message being from a physically remote server and requesting information comprising status of the mobile device from the mobile device;
  maintain a state of said mobile device in response to said information; and
  be prepared to respond to said message in response to said state;
  wherein said state includes a selection of one of a plurality of possible actions in response to said message, said plurality of possible actions including at least: responding to said message in a first way, responding to said message in a second way, declining to respond to said message.

18. Apparatus as in claim 17, wherein said state is responsive to at least one of: a position of said mobile device, a velocity of said mobile device, a time, or a combination or conjunction of two of said values.

19. Apparatus as in claim 17, wherein said message includes a request for tracking information.

20. Apparatus as in claim 19, wherein said first way does not include said tracking information.

21. Apparatus as in claim 19, wherein said first way includes said tracking information.

22. Apparatus as in claim 19, wherein said first way includes information other than said tracking information.

23. Apparatus including
  means for receiving a message, at a mobile device, from a physically remote server requesting information from the mobile device, the information comprising status of the mobile device;
  means for, in response to said message, requesting a response from a user of said mobile device; and
  means for, in response to said response, taking one of a plurality of possible actions in response to said message, said plurality of possible actions including at least: responding to said message in a first way, responding to said message in a second way, declining to respond to said message.

24. Apparatus as in claim 23, wherein said message includes a request for tracking information.

25. Apparatus as in claim 24, wherein said first way does not include said tracking information.

26. Apparatus as in claim 24, wherein said first way includes said tracking information.

27. Apparatus as in claim 24, wherein said first way includes information other than said tracking information.

28. Apparatus including
  means for receiving information from a user regarding how to respond to a message, said message being from a physically remote server and requesting information comprising status of the mobile device from the mobile device;
  means for maintaining a state of said mobile device in response to said information; and
  means for being prepared to respond to said message in response to said state;
  wherein said state includes a selection of one of a plurality of possible actions in response to said message, said plurality of possible actions including at least: responding to said message in a first way, responding to said message in a second way, declining to respond to said message.

29. Apparatus as in claim 28, wherein said state is responsive to at least one of: a position of said mobile device, a velocity of said mobile device, a time, or a combination or conjunction of two of said values.

30. Apparatus as in claim 28, wherein said message includes a request for tracking information.

31. Apparatus as in claim 28, wherein said first way does not include said tracking information.

32. Apparatus as in claim 30, wherein said first way includes said tracking information.

33. Apparatus as in claim 30, wherein said first way includes information other than said tracking information.

34. A method, including steps of
  receiving a message, at a mobile device, from a physically remote server requesting information from the mobile device, the information comprising status of the mobile device;
  in response to said message, requesting a response from a user of said mobile device;
  in response to said response, selecting one of a plurality of possible actions in response to said message, said plurality of possible actions including at least: responding to said message in a first way, responding to said message in a second way, declining to respond to said message; and
  taking the selected action.

* * * * *